C. H. FULTON.
PROCESS FOR ROASTING ORE.
APPLICATION FILED AUG. 19, 1916.
1,273,844.
Patented July 30, 1918.
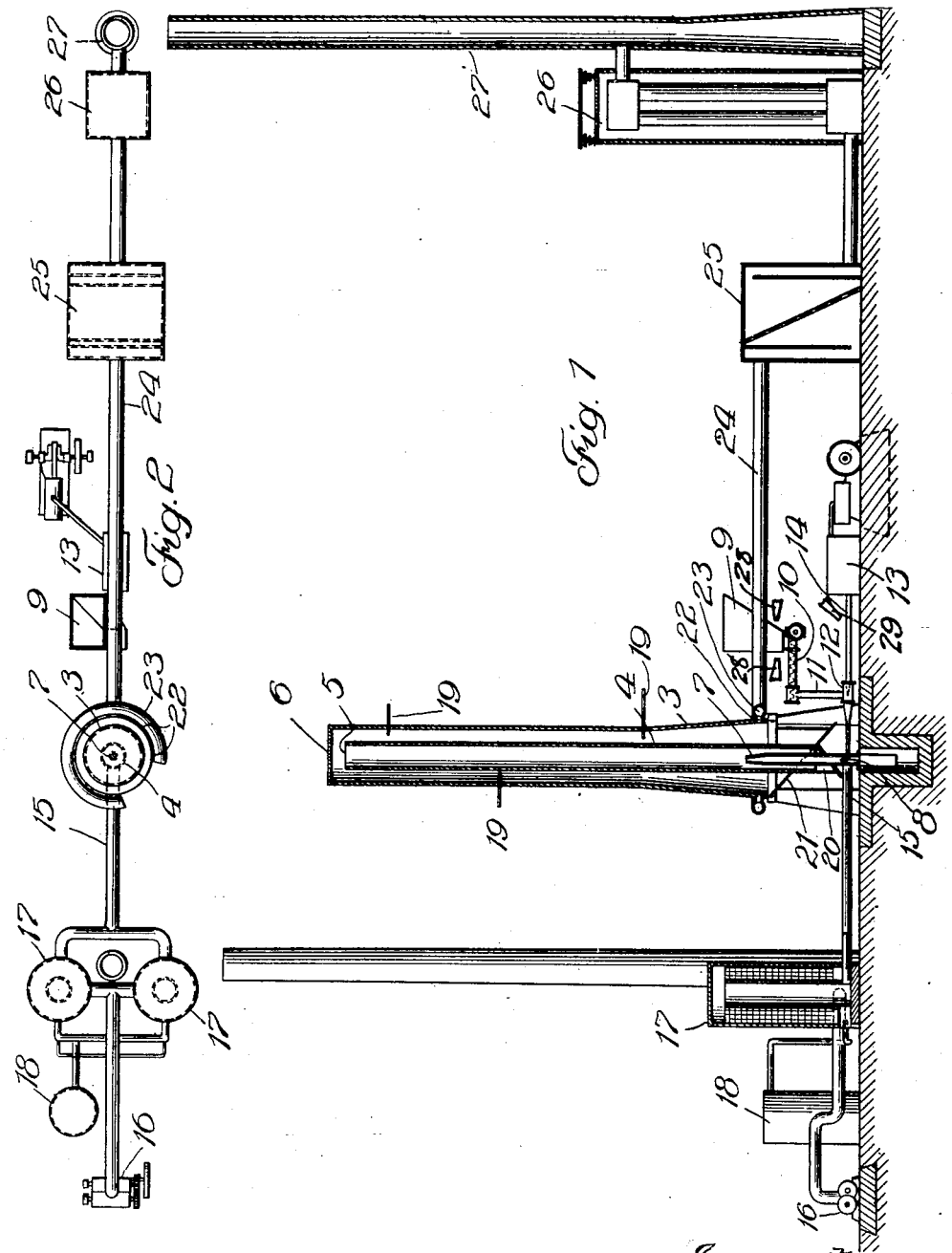

UNITED STATES PATENT OFFICE.

CHARLES H. FULTON, OF CLEVELAND, OHIO, ASSIGNOR, BY MESNE ASSIGNMENTS, TO METALLURGICAL LABORATORIES, INCORPORATED, OF CHICAGO, ILLINOIS, A CORPORATION OF ILLINOIS.

PROCESS FOR ROASTING ORE.

1,273,844. Specification of Letters Patent. Patented July 30, 1918.

Application filed August 19, 1916. Serial No. 115,904.

*To all whom it may concern:*

Be it known that I, CHARLES H. FULTON, a citizen of the United States, residing at Cleveland, in the county of Cuyahoga and State of Ohio, have invented certain new and useful Improvements in Processes for Roasting Ore, of which the following is a specification.

More specifically my invention relates to the roasting of finely divided ore such as the concentrate from the "flotation" process. The common process of roasting ore in a bed upon a hearth presents difficulties when applied to ores which are very finely divided for the reason that the ore particles are so closely packed together that the air by which the oxidation is effected reaches only a thin surface layer and does not penetrate to the interior of the mass. Rabbling only in a limited degree obviates this difficulty.

Various methods have been proposed, and some of them put into actual use to obviate the objections inherent in such process, some of which are based upon the principle of effecting the oxidation of the ore by passing or spraying the particles thereof through heated air and products from the combustion of carbonaceous fuel. Among other such processes of roasting ores it has been proposed to drop the ore through a vertical shaft against an ascending column of heated air more or less mixed with products of combustion arising from the burning of carbonaceous fuel. It was found, however, that in this process, as applied to ore relatively finely crushed but containing coarse and fine particles of various sizes, the larger particles falling to the bottom of the shaft and there collected are only partially desulfurized while the finer particles are carried by the ascending air and gases beyond the heat zone and collected as imperfectly roasted flue dust. This process is therefore inapplicable to very finely divided ores and is further objectionable in that the air being diluted and contaminated by the products of combustion from the fuel used in heating it, is rendered less active as an oxidizing agent, requiring larger quantities of air and more prolonged treatment to effect the desulfurization and also rendered unfit or inferior for use in the the manufacture of sulfuric acid for which such fumes are otherwise well adapted. Various modifications of the process above described have been proposed or resorted to with indifferent success prior to my invention.

My invention is based upon the fact that the best results are to be obtained by providing the maximum surface of contact between the oxidizing air and the ore to be sulfurized by employing the latter in a finely divided condition and surrounding each particle with an envelop of air undiluted or contaminated with other gases and maintaining the contact and conditions for the time required to effect the desired degree of desulfurization, the materials entering into the reaction being of course maintained at or above the ignition temperature of the ore. In carrying out my process the ore which is so finely pulverized as to be readily sustained in or carried by air, is injected by means of a current of high pressure air into a furnace which provides a long conduit capable of withstanding the required degree of heat. Preheated air at relatively low pressure and unmixed with other gases and in volume sufficient to effect the required degree of desulfurization is blown into the furnace with the current of air-suspended ore, the air being heated to such a temperature as to ignite the ore almost immediately upon its entering the furnace. The main object to be accomplished is the ignition of the ore practically immediately it enters the furnace. This depends upon the temperature of the ore-air mixture, which temperature may be raised to the proper point by either preheating the air as described, or preheating the ore, or both. The length of the conduit furnished by the furnace is such as to provide contact between the suspended ore particles and the surrounding air for a sufficient length of time, at the speed at which the mixture is conveyed through the furnace, to accomplish the desired degree of desulfurization. The powdered ore is separated from the air and gaseous products of the operation at the end of the conduit by settling, either with or without the aid of the well known method of electrical dust precipitation, and the gaseous products containing oxids of sulfur may be utilized for the production of sulfuric acid.

In the accompanying drawings I have shown and in this specification described in detail a preferred form of apparatus for carrying out my invention. It is to be understood, however, that the improved process is independent of the particular apparatus employed and that, so far as the invention relates to the apparatus, the specific disclosure is for the purpose of exemplification only, the scope of the invention being defined in the following claims in which I have endeavored to distinguish it from the prior art so far as known to me without, however, relinquishing or abandoning any portion or feature thereof.

In the drawing, which is largely diagrammatic, Figure 1 is a side elevation of the preferred form of apparatus for carrying out my invention; and Fig. 2 a plan view of the same.

The furnace 3, as shown, is vertical and comprises concentric conduits of fire brick or other suitable heat-resisting material, the inner conduit 4 being open at its upper end 5 and terminating short of the closed upper end 6 of the outer conduit, thus furnishing a central conduit up which the mixture of air and ore is conveyed and a return conduit down which the mixture may travel. In the broader aspect of my invention, however, the form of the furnace is immaterial, it being only essential that it provide a conduit of sufficient length under the conditions of speed of travel of the mixture and character of the ore to provide for contact between the air and the ore for a sufficient length of time to insure the proper degree of desulfurization. An injector tube 7 projects into the lower end of the inner conduit of the furnace and is supplied with a mixture of ore and air from the ore inlet pipe 8 which may be arranged, if desired, to give a spiral motion to the mixed air and ore as it enters the injector tube 7. Tube 8 is supplied with ore from a hopper 9, a screw feed 10 discharging a continuous stream of ore from the hopper through a vertical conduit 11 leading to an injector chamber 12 into which air from a compressor 13 is introduced by a pipe 14. It is ordinarily desirable, in order that the mixture of air and ore attain the ignition temperature as soon as possible after it enters the furnace, to preheat the ore, or the air supplied by the compressor 13, or both, but not to a temperature at which ignition takes place. The amount of air supplied by the compressor 13 is preferably just sufficient to properly suspend or float the pulverized ore and convey it into the furnace. Heated air is introduced to the injector tube 7 through a pipe 15 which enters said tube at about the same level as the nozzle 8 of the tube conveying the suspended ore so that the heated air and powdered ore are intimately mixed and the latter suspended in the former before the mixture leaves the injector proper to enter the furnace. The heated air is furnished by a blower 16 supplying a pair of hot air stoves 17, 17, which may be of the usual or any suitable type, and are commonly used alternately, the stove not in use being heated as usual by gas from a producer 18. Such combination of blower, hot air stoves and producer is common and well known for the purpose of heating air for furnace work. The total amount of air furnished per unit weight of ore varies with the particular ore and its physical condition but ordinarily one and one-half or two times that theoretically necessary to burn the sulfur of the ore is supplied.

The temperature to which the air is raised by the hot air stoves depends upon a number of conditions, it being desirable to raise the ore to its ignition point as soon as possible after it enters the furnace or conduit since, if the ignition and desulfurization being a substantial distance from the point where the mixture enters the furnace, the latter must furnish a correspondingly longer conduit in order to get the same result *ceteris paribus*. The time required to bring the ore to the ignition point in the furnace, however, depends not only upon the temperature of the heated air but also upon the temperature of the ore and its accompanying body of air as well as upon the temperature of the furnace. The temperature of the furnace or conduit walls, after the operation has been started, depends upon the heat units of the particular sulfid being treated as well as upon the temperature at which the air and ore are introduced, and if the fuel value of the ore is low it will be necessary to correspondingly increase the temperature at which the materials are fed into the furnace. The ore and the air introduced therewith may be heated in any suitable manner, and for this purpose I have indicated burners 28 for heating the ore in the hopper and a burner 29 for heating the air supplied therewith. It is also desirable that the furnace have a reasonably high temperature before desulfurization is started and for this purpose I may provide the outer wall with a series of gas or other burners 19 which may be ignited before the desulferizing process is started to raise the temperature of the furnace to the required point and then extinguished. The amount of air introduced into the furnace is dictated not only by the requirements of efficient oxidation and economy but also by the speed of travel of the mixture through the furnace, it being desirable that the mixture travel as slowly as possible without premature deposition of the ore in order to have prolonged contact between the air and ore without unduly increasing the length of the conduit.

The bottoms of the inner and outer conduits, respectively, are provided with hoppers 20, 21, of any desired or approved type in which the main body of the desulfurized ore collects and from which it may be withdrawn. The gaseous products of combustion are drawn off at the bottom of the furnace through a series of openings 22 communicating with a flue 23, the openings being of sufficient size to avoid unduly increasing the speed of flow of the gases at this point. From the flue 23 the gases are conveyed by pipe 24 to a dust collecting chamber 25, an electrical precipitator 26 and a stack 27. In case the gases are to be utilized for the manufacture of sulfuric acid they may be led to a plant for such manufacture instead of to a stack.

By means of my improved process and apparatus the maximum surface of contact between the ore and air is provided. Temperatures may be so regulated that ignition begins immediately upon the entry of the ore into the furnace but not before, and continues under most favorable conditions of temperature and contact throughout the course of the mixture of ore and air through the furnace. The heat of combustion of the sulfur of the ore is economically utilized in the process in maintaining the temperature of the furnace. The speed of travel of the mixture through the furnace may be governed by controlling the volume of air supplied and thus the extent of desulfurization can be controlled at will. By preheating the air without admixture of and dilution by products of combustion it is rendered more active and efficient in oxidizing the sulfur of the ore requiring the handling of smaller quantities of air to effect the same result, and the resultant gases consisting only of air and sulfur oxids are more suitable for the manufacture of sulfuric acid.

I claim:

1. A process of roasting finely divided sulfid ores comprising forming a mixture of pulverized ore and preheated air thereby raising the temperature of the ore to the ignition point, conveying such mixture of air and ore together slowly while maintaining the suspension and temperature of the ore until the required degree of desulfurization is attained and then separating the ore from the gases and air.

2. A process of roasting finely divided sulfid ores comprising forming a suspension of ore in air at a temperature below the ignition point of the former, mixing the suspended ore with preheated air at a temperature above the ignition point of the ore, slowly moving such mixture of air and ore together while maintaining the suspension and temperature of the ore until the required degree of desulfurization is attained and then separating the ore from the gases and air.

3. A process of roasting finely divided sulfid ores comprising forming a mixture of pulverized ore and preheated air free from products of combustion thereby raising the temperature of the ore to the ignition point, conveying such mixture of air and ore together slowly while maintaining the suspension and temperature of the ore until the required degree of desulfurization is attained and then separating the ore from the gases and air.

4. A process of roasting finely divided sulfid ores comprising forming a mixture of pulverized ore and preheated air thereby raising the temperature of the ore to the ignition point, conveying such mixture of air and ore together slowly while maintaining the suspension and temperature of the ore and without further additions of air until the required degree of desulfurization is attained and then separating the ore from the gases and air.

5. A process of roasting finely divided sulfid ores comprising preheating the pulverized ore, forming a mixture of pulverized ore and preheated air thereby raising the temperature of the ore to the ignition point, conveying such mixture of air and ore together slowly while maintaining the suspension and temperature of the ore until the required degree of desulfurization is attained and then separating the ore from the gases and air.

6. A process of roasting finely divided sulfid ores comprising and without admixture of products of combustion forming a mixture of pulverized ore and preheated air thereby raising the temperature of the ore to the ignition point, conveying such mixture of air and ore together slowly while maintaining the suspension and temperature of the ore until the required degree of desulfurization is attained and then separating the ore from the gases and air.

7. A process of roasting finely divided sulfid ores comprising preheating air without admixture of products of combustion, forming a mixture of pulverized ore and preheated air thereby raising the temperature of the ore to the ignition point, conveying such mixture of air and ore together slowly while maintaining the suspension and temperature of the ore until the required degree of desulfurization is attained and then separating the ore from the gases and air.

8. A process of roasting finely divided sulfid ores comprising forming a mixture of pulverized ore and preheated air thereby immediately raising the temperature of the ore to the ignition point, conveying such mixture of air and ore together slowly while maintaining the suspension and temperature of the ore until the required degree of desulfurization is attained and then separating the ore from the gases and air.

9. A process of roasting finely divided sulfid ores comprising forming a mixture of pulverized ore and preheated air free from products of combustion thereby raising the temperature of the ore to the ignition point, conveying such mixture of air and ore together slowly while maintaining the suspension and temperature of the ore until the required degree of desulfurization is attained and then separating the ore from the gases and air and utilizing the resultant gases in the manufacture of sulfuric acid.

10. A process of roasting finely divided sulfid ores comprising forming a mixture of pulverized ore and air at a temperature above the ignition point of the ore, conveying such mixture of air and ore slowly while maintaining the suspension and temperature of the ore until the required degree of desulfurization is attained and then separating the ore from the gaseous products.

11. A process for roasting which consists in forming a suspension of finely divided ore in air at a temperature slightly below the ignition point of the ore, then introducing the mixture of ore and air into a heated space at a temperature sufficient to cause practically immediate ignition of the ore particles, and maintaining the ore particles in suspension a sufficient period to obtain the required degree of desulfurization.

CHARLES H. FULTON.